United States Patent [19]

Venkat et al.

[11] Patent Number: 4,892,646

[45] Date of Patent: Jan. 9, 1990

[54] METHOD FOR TREATING DEWAXING CATALYSTS

[75] Inventors: Chaya Venkat, Princeton; Darrell D. Whitehurst, Titusville, both of N.J.

[73] Assignee: Mobil Oil Corporation, New York, N.Y.

[21] Appl. No.: 189,454

[22] Filed: May 2, 1988

Related U.S. Application Data

[60] Division of Ser. No. 87,196, Aug. 20, 1987, abandoned, which is a continuation-in-part of Ser. No. 937,951, Dec. 4, 1986, abandoned.

[51] Int. Cl.$^4$ ............... C10G 11/05; C10G 47/20; C10G 47/18; B01J 29/38
[52] U.S. Cl. .................................. 208/111; 208/55; 208/120; 502/30; 502/31; 502/53; 585/467; 585/475; 585/485
[58] Field of Search ............ 208/111, 50, 53, 54, 208/55, 120; 502/62, 64, 66, 77, 85, 30, 31, 34, 53

[56] References Cited

U.S. PATENT DOCUMENTS

| | | | |
|---|---|---|---|
| 3,254,021 | 5/1966 | Mason et al. | 502/53 |
| 3,424,671 | 1/1969 | Kay | 208/111 |
| 3,505,207 | 4/1970 | Haney et al. | 502/30 |
| 3,565,820 | 2/1971 | Coons, Jr. et al. | 502/30 |
| 4,358,395 | 11/1982 | Haag et al. | 502/53 |
| 4,541,919 | 9/1985 | La Pierre et al. | 208/111 |

FOREIGN PATENT DOCUMENTS 7307241 8/1973 Netherlands ............ 208/111

*Primary Examiner*—Paul E. Konopka
*Attorney, Agent, or Firm*—Alexander J. McKillop; Charles J. Speciale; Malcolm D. Keen

[57] ABSTRACT

A method for treating a porous crystalline catalyst optionally associated with a metal component such as a noble and/or base metal(s) is described. The method comprises contacting the catalyst with a low molecular weight aromatic compound under coking conditions. Such a treatment method increases the cycle length and the useful life of the catalyst. Using the treated catalyst in a dewaxing process and regenerating the catalyst by treating with hydrogen and a low molecular weight hydrocarbon.

4 Claims, 5 Drawing Sheets

METHOD FOR TREATING DEWAXING CATALYSTS

RELATED APPLICATION

This is a divisional of copending application Ser. No. 087,196, filed on Aug. 20, 1987 which is a continuation-in-part application of U.S. Ser. No. 937,951, filed Dec. 4, 1986, both now abandoned.

BACKGROUND OF THE INVENTION

1. Field of the Invention

This invention relates to a process for treating dewaxing catalysts.

Catalytic dewaxing processes not only remove the waxy components of hydrocarbon feedstocks, but also convert these components into other materials of higher value. Catalytic dewaxing processes achieve this end by selectively cracking long chain n-paraffins to produce low molecular weight products which may be removed by distillation.

Catalysts usually employed in a dewaxing reactor have a pore size which admit the straight chain n-paraffins but exclude more highly branched materials, cyclo-aliphatics and aromatics. The catalyst usually employed are the zeolites which include the intermediate pore size zeolites such as ZSM-5, ZSM-11, ZSM-12, ZSM-23, ZSM-35, ZSM-38 and ZSM-48. These zeolites may also contain a hydrogenation-dehydrogenation component, e.g., a noble metal such as platinum, or palladium, a base metal such as nickel, tungsten, etc. or base metals.

Typically, the catalytic dewaxing reactor is operated at a start of cycle temperature of 540° to about 580° F. (232°–304° C.). The operating temperature is increased by about 2° to about 10° F. per day—depending on feed, catalyst and space velocity—to compensate for decreased catalyst activity. By continuous temperature increases a lube having a specific pour point may be continually produced. Temperatures are increased to an end-of-cycle ceiling temperature of between 655° and about 695° F. (346°–368° C.), usually about 675° F. (357° C.). At the end of the cycle, usually about 10 days, the reactor must be shut down to regenerate the catalyst.

Catalytic dewaxing catalyst reactivation or regeneration is expensive and an initial regeneration or regenerations is usually accomplished by high temperature $H_2$ regeneration conducted between 900° and 980° F. (482°–526° C.). Hydrogen regeneration generally removes soft deposits of coke. Hydrogen regeneration, however does not always completely restore the original level of activity of the catalyst. For example, it has been observed that following hydrogen regeneration of an HZSM-5 catalyst, the cycle length for a catalytic dewaxing operation is substantially less than the original cycle length. The number of days the catalyst can remain on stream decreases from cycle to cycle and eventually continued reactivation becomes impractical. This loss of activity is primarily caused by a hard carbonaceous residue containing nitrogen, sulfur and oxygen heteroatoms left on the catalyst which hydrogen regeneration does not remove. After a predetermined level of deactivation, oxygen regeneration is employed to burn this hard coke residue off the catalyst and achieve activity resembling that of a fresh or original catalyst. Although oxygen regeneration restores catalyst activity, such treatments are expensive, and the high temperature required for regeneration can result in catalyst sintering. Catalyst regeneration is described in more detail in U.S. Pat. Nos. 3,904,510; 3,986,982; and 3,418,256.

While air (oxygen) regeneration can be effective to rid the catalyst of hydrocarbon residues, a decrease in cycle length has also been observed. When the catalyst contains a metal component, e.g., a hydrogenation-dehydrogenation noble metal such as platinum or palladium and/or a base metal such as nickel, air regeneration can result in still other problems such as metal sintering and agglomeration.

The present invention relates to pretreating a dewaxing catalyst to increase the original cycle length, subsequent cycle lengths, and the useful life of such a catalyst by passing a low molecular weight aromatic hydrocarbon over a dewaxing catalyst at a temperature greater than 800° F. for a time sufficient to deposit on the catalyst between 2 and 30% of coke, by weight of the catalyst. The pretreatment may be conducted in the presence of hydrogen gas.

It is known to coke large pore zeolites. For example, U.S. Pat. No. 4,541,919 to LaPierre et al, which is incorporated herein by reference, discloses the coking of zeolites having Constraint Index of less than 1. Such zeolites include zeolite X, zeolite Y, ZSM-3, ZSM-4 and ZSM-20, and Zeolite Beta. Coking such large pore zeolites restricts the pore size of the zeolite. Coking large pore zeolites allows such a catalyst to simulate a shape-selective zeolite such as ZSM-5. Sources of coke used on large pore zeolites per LaPierre et al include relatively light hydrocarbons, such as n-butane through n-hexane and highly aromatic cycle oil. Such cycle oil is characterized by the presence of dicyclic aromatics. La Pierre et al disclose or suggest nothing about the process of increasing the cycle life or useful life of intermediate pore or even larger size dewaxing catalysts. LaPierre et al is merely concerned with reducing larger pore sizes.

U.S. Pat. No. 4,231,899 to Chen et al, which is incorporated herein by reference, teaches the deposition of coke within the pores of a ZSM-5 catalyst used in a catalytic reaction in which steam may be present as a component of the feed or as a reaction product. Chen et al suggest that the active sites on the catalyst are protected by the coke. Compounds used by Chen to deposit coke within the pores of ZSM-5 include unsaturated hydrocarbons such as olefins, diolefins, dicyclic aromatics, picoline N-oxide and tripropyl N-oxide. Chen et al do not teach or suggest coking intermediate pore zeolites for use in catalytic dewaxing processes to extend cycle length and catalyst life.

European Patent Application No. 134,076, filed June 6, 1984 by Chang et al which is incorporated by reference herein, relates to the use of coked ZSM-5 catalyst for use in disproportionating toluene to para-xylene. Chang et al disclose that coking enhances the diffusability of the catalyst and they have discovered that liquid hourly space velocity can be reduced using such a coked catalyst.

SUMMARY OF THE INVENTION

This invention relates to a method of pretreating a fresh dewaxing catalyst prior to a first catalytic dewaxing cycle or an original cycle which comprises contacting the fresh dewaxing catalyst with one or more low molecular weight aromatic compounds under conditions which deposit between 2 and 30% of coke, by weight of the catalyst, on the catalyst.

DETAILED DESCRIPTION OF THE INVENTION

Figure 2:
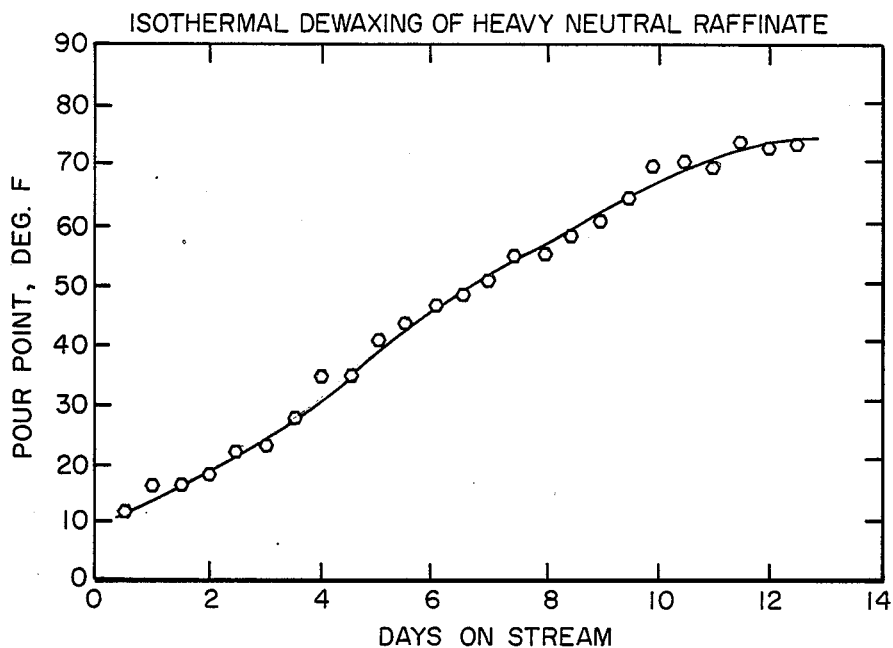
FIG. 2 shows the isothermal aging profile of a catalyst subjected to dewaxing conditions.

As described above, in zeolite dewaxing processes it is common practice to operate the dewaxing process in such a manner so as to maintain constant product properties. Generally, in catalytic dewaxing process a hydrocarbon feedstock is processed so that a product having a constant pour point is obtained. Because of trace poisons in the feed such as nitrogen and metals, and by virtue of the occurrence of side reactions caused by the presence of olefins, the catalyst gradually loses activity. This lost activity is compensated for by gradually raising the temperature of the dewaxing reactor. By raising the temperature, a constant pour point product can be obtained. FIG. 2 shows the effects of catalyst aging during dewaxing conditions without the adjustment of reactor temperature. As can be seen the pour point of obtained products gradually rises.

To compensate for this decrease in catalyst activity the temperature of the reactor is gradually increased. However, at a temperature ceiling of about 675° C. the dewaxing catalyst rapidly deactivates. Thus the length of time that a catalyst can be used has a finite limit and is a function of the product specification and the composition of the feed. Nitrogen in the feed is a poison which greatly affects catalyst activity.

By coating dewaxing catalyst with deposits of between 2 and 30% by weight of coke the harmful effects of extraneous poisons within the feed may be overcome. The instant invention relates to pretreating or treating a dewaxing catalyst prior to a first catalytic dewaxing cycle by passing a low molecular weight aromatic hydrocarbon over the catalyst at a temperature of greater than 800° F., preferably above 900° F., for a time sufficient to deposit 2 to 30% by weight of coke, based on the weight of catalyst, onto the catalyst. At 900° F. coking time is about seventy two hours. The conditions of treatment may be varied so that by raising the temperature, pretreatment time may be reduced. Conversely, by increasing treatment times the temperature may be reduced. The presence of hydrogen, during coking, at pressures of 15 to 1000 psi, and preferably between 200 to 600 psi, is also desirable.

The aromatic compounds used to treat the catalyst under the conditions described above include one-ring aromatic compounds such as benzene, toluene, and xylenes, or other normal or branched $C_1$ to $C_4$ multiple substituted benzenes. Other light aromatics which may be used include naphthalene and mono or multiply substituted normal and branched $C_1$ to $C_4$ alkyl naphthalenes. The light aromatic compounds which can be used have a molecular weight of about 78 to 200 gr/mole. Naphtha comprising raw or processed refinery streams containing substantial quantities of such aromatics may also be used. Examples of such refinery streams include natural gas condensates, straight run naphthas, reformates, cracked gasolines, UDEX extracts, such as BTX, light cycle oils and other aromatic chemical streams. These streams, however, should be free of poisons such as metals and nitrogen, and nitrogen-containing compounds.

It is believed, however, that the use of unsubstituted or lightly substituted low molecular weight aromatics produce the best results.

The treatment of the zeolite catalysts with aromatic compounds in accordance with this invention is critical. The use of cyclohexane, n-butane through n-hexane, olefins and diolefins as recited in the U.S. patents described above do not produce catalysts having increasing dewaxing cycle lengths when zeolite catalysts are coked with these materials. It is believed that such a coked structure provides a non-stick coating over the catalyst to protect the catalyst from poisons.

Figure 1:
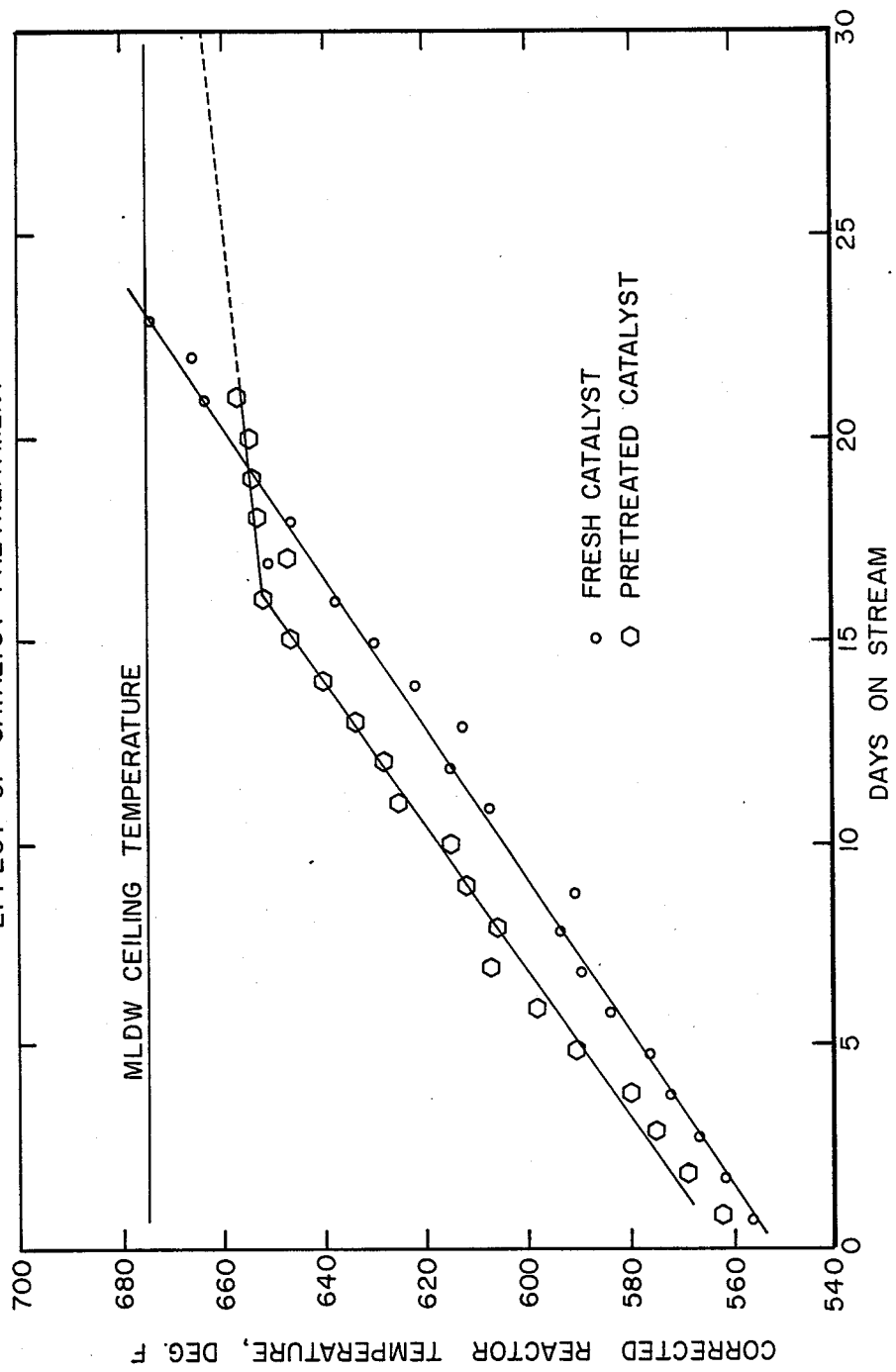
FIG. 1 is a dual plot of corrected reactor temperatures in degrees Fahrenheit versus days on stream for a catalyst treated in accordance with the invention and a non-treated catalyst. The treated catalyst has an increased cycle length.

Although the structure and mechanism described above are only postulated it has been found that coked coating obtained by passing low molecular weight aromatic compounds over dewaxing catalyst under coking conditions, initially lowers the activity of the catalyst relative to an untreated dewaxing catalyst. This phenomenon is shown in FIG. 1. However, as also shown in FIG. 1, the subsequent activity of the catalyst is enhanced and such enhanced activity provides for greater cycle lengths. With specific reference to FIG. 1, it is shown that the pretreated catalyst has reduced activity through the temperature range of about 563° F. to 655° F. (295° to 346° C.). Catalyst activity is similar for the pretreated and non-treated catalyst at about 658° F. (347° C.) but thereafter the pretreated catalyst unexpectedly shows greater activity or an unexpected ability to produce a lube product having a constant pour point at reduced temperatures or a constant pour point product for longer periods prior to reaching a reactor ceiling temperature. As described above, the increase in cycle length allows the catalyst to be used for longer periods between conventional regeneration steps. The result is that the catalyst is subjected to fewer degradation steps thus increasing its useful life. Additional benefits of this pretreatment include slightly higher lube yields and better viscosity properties.

Catalysts which benefit from the pretreatment, or treatment by coking before a first or original catalytic dewaxing cycle, include the medium or intermediate pore shape-selective zeolites having a Constraint Index of 1 to 12.

CONSTRAINT INDEX

The members of the class of zeolites to be treated by the method herein have an effective pore size of generally from about 5 to about 8 Angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolite ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g., less than 5 Angstroms. On the other hand, zeolites which provide relatively free access to the internal zeolite structure have a low value for the Constraint Index, and usually pores of large size, e.g., greater than 8 Angstroms. The method by which Constraint Index is determined is described fully in U.S. Pat. No. 4,016,218, incorporated herein by reference for details of the method.

Constraint Index (CI) values for some typical materials are:

|  | CI | (at test temperature) |
|---|---|---|
| ZSM-4 | 0.5 | (316° C.) |
| ZSM-5 | 6–8.3 | (371° C.–316° C.) |
| ZSM-11 | 5–8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

The above-described Constraint Index is an important and even critical definition of those zeolites which are treated by the method of in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g., temperature, as to establish more than one value for the Constraint Index of a particular zeolite. This explains the range of Constraint Indices for some zeolites, such as ZSM-5, ZSM-11 and Beta.

It is to be realized that the above C.I. values typically characterize the specified zeolites, but that such are the cumulative results of several variables used in determination and calculation thereof. Thus, for a given zeolite exhibiting a C.I. value within the range of 1 to 12, depending on the temperature employed within the range of 290° C. to about 538° C., with accompanying conversion between 10% and 60%, the C.I. may vary within the indicated range of 1 to 12. Likewise, other variables such as the crystal size of the zeolite, the presence of possibly occluded contaminants and binders intimately combined with the zeolite may affect the C.I.. It will accordingly be understood by those skilled in the art that the C.I., as utilized herein, while affording a highly useful means for characterizing the zeolites of interest is an approximation, taking into consideration the manner of its determination, with the possibility, in some instances, of compounding variable extremes. However, in all instances, at a temperature within the above-specified range of 290° C. to 538° C., the C.I. will have a value for any given zeolite of interest herein within the approximate range of 1 to 12.

The invention may be particularly practiced with catalyst selected from the group consisting of ZSM-5, ZSM-11, ZSM-22, ZSM-23, ZSM-35, ZSM-38, and ZSM-48.

The invention is further illustrated by reference to the following examples and figures referred to herein.

EXAMPLE 1

Catalyst Pretreatment

An HZSM-5 catalyst containing 2% Ni bound with 35% $Al_2O_3$ was prepared by conventional methods. This catalyst was activated as is known in the art by treating it in an inert atmosphere at elevated temperatures. Thereafter, the catalyst was pretreated in accordance with the invention. That is, the catalyst was contacted with low molecular weight aromatic toluene for 72 hours at a liquid hourly space velocity of 1 at a temperature of 900° F. in the presence of hydrogen gas at 400 psig at a circulation rate of 2,500 SCF/bb1.

The pretreated catalyst prepared above was used to catalytically dewax an Arabian light crude which was extracted with furfural. The catalyst was continually used under conventional catalytic dewaxing conditions in the reactor to obtain a dewaxed product having a pour point of 20° F. This pour point was continually achieved by progressively raising the reactor temperature as the catalyst became deactivated. After about 20 days on stream as shown in FIG. 1, the catalyst continued to produce a product having a pour point of 20° F. while the reactor temperature, though continually increased, was kept below the dewaxing temperature ceiling of 675° F. (357° C.). As shown by the broken line in FIG. 1 it is postulated, by extrapolation, that a constant pour point product may be obtained using a catalyst pretreated in accordance with the method of this invention, in a dewaxing reactor for 30 days or longer without reaching the dewaxing temperature ceiling of 675° F.

Comparative Example 1

An HZSM-5 catalyst containing 2% Ni bound with 35% $Al_2O_3$ was prepared by conventional methods. This catalyst was activated as is known in the art by treating it in an inert atmosphere at elevated temperatures. This catalyst was similar to the catalyst prepared as disclosed above. However, this catalyst was not pretreated in a coking atmosphere as described above.

The non-coked catalyst was used to catalytically dewax an Arabian light crude similar to the crude disclosed in Example 1. The catalyst was continually used under conventional catalytic dewaxing conditions to obtain a dewaxed product having a pour point of 20° F. This pour point was continually achieved by raising the reactor temperature as the catalyst became deactivated. After about 23 days on line, as shown in FIG. 1, the 20° F. pour point no longer be obtained under reactor temperature conditions of 675° F. or less.

The examples demonstrate that a pre-coked or pre-treated catalyst may be used for longer cycle lengths and, that the useful life of the catalyst may be extended in view of the fact that the catalyst may go for longer periods without having to be regenerated.

Although the method of treating a catalyst by coking the catalyst with aromatic compounds prior to a first use improves the cycle length and lifetime of a medium pore size dewaxing catalyst, such as catalyst will eventually become deactivated. Such a deactivated dewaxing catalyst may also then be regenerated, by coking it with aromatic compounds as more fully described below.

The catalysts which are advantageously reactivated in accordance with the method of this invention are crystalline metallophosphates and metallosilicate zeolites of relatively large or medium pore size. Metallophosphate catalysts which can be reactivated by the method of this invention include the aluminophosphates described in U.S. Pat. Nos. 4,310,440 and 4,385,994 and the silicoaluminophosphates described in U.S. Pat. No. 4,440,871. Suitable metallosilicate zeolites include zeolite Z (U.S. Pat. No. 2,882,243), zeolite X (U.S. Pat. No. 2,882,244), zeolite Y (U.S. Pat. No. 3,130,007), zeolite Beta (U.S. Pat. No. 3,308,069), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-23 (U.S. Pat. No. 4,076,842), zeolite ZSM-35 (U.S. Pat. No. 4,016,245), zeolite ZSM-38 (U.S. Pat. No. 4,046,859), zeolite ZSM-35 (U.S. Pat. No. 4,016,245), zeolite ZSM-48 (U.S. Pat. No. 4,375,573), merely to name a few. Zeolites containing a framework element other than, or in addition to, aluminum, e.g., boron, iron, titanium, zirconium, gallium, germanium, and the like, are also suitable for reactivation in accordance with the method herein. Such zeolites are known from, inter alia, U.S. Pat. Nos. 3,328,119; 3,329,480; 3,329,481; 4,414,423; and, 4,417,088. A summary of the channel description and composition of these and other zeolite catalysts suitable for reactivation by the method of this invention is set forth below.

| Zeolite Channel and Composition Summary | | |
|---|---|---|
| Zeolite | Isotypes[a] | Silica/Alumina Ratio[b] |
| Medium Pore | | |
| ZSM-35 | Ferrierite | >8 |
| ZSM-22 | | >20 |
| ZSM-23 | | 40–250 |
| ZSM-48 | | >25 |
| ZSM-5 | | >12 |
| ZSM-11 | | 20–90 |
| ZSM-50 | | 20–100 |
| ZSM-12 | | 20–100 |
| Heulandite | | 7 |
| Offretite | | 7 |
| Large Pore | | |
| Mordenite | | 10 |
| Beta | | 5–100 |
| Gmelinite | | 4 |
| Linde Type L | | 6 |
| ZSM-4 | Omega | 3–20 |
| Mazzite | | |
| Faujasite | X,Y | 2–6 |

[a]Common isotypes.
[b]Typical composition ranges.

The method of this invention especially contemplates the reactivation of a medium pore aluminosilicate zeolite, e.g., ZSM-5, ZSM-11, ZSM-12, ZSM-23, ZSM-35, ZSM-38, ZSM-48, and the like, containing a hydrogenation-dehydrogenation component, e.g., a noble metal such as platinum, or palladium, a base metal such as nickel, tungsten, etc., or combination of noble metal and base metal. These and the crystalline silicate zeolite catalysts generally can be unbound, self-bound or composited with a binder such as silica, alumina, silica-alumina, etc.

The source of the spent porous crystalline catalyst can be any one of numerous conversion processes which result in a progressive loss of catalytic activity due to the accumulation of pore-plugging carbonaceous residues. Such conversion processes include, as non-limiting examples, cracking hydrocarbons with reaction conditions including a temperature of from about 250° C. to about 700° C., a pressure of from about 0.1 atmosphere (bar) to about 30 atmospheres and a weight hourly space velocity of from about 0.1 to about 100; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g., benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g., methanol, ethanol, Fischer-Tropsch product, or ethers, e.g., dimethylether, or mixtures thereof, to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g., benzene and alkylbenzenes, in the presence of an alkylating agent, e.g., olefins, formaldehyde, alkyl halides and alcohols, with reaction conditions including a temperature of from about 50° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; distillate dewaxing of gas oil, coker tower bottoms, fraction reduced crude, vacuum tower bottoms, vacuum resids, etc., with reaction conditions including a temperature of from about 450° F. to about 930° F., a pressure of about 100 to 3000 psig, a partial pressure of hydrogen of about 2300 psig or less and a hydrogen/feedstock ratio of about 100 to about 20,000 SCF/bbl, and an LHSV of from about 0.1 to about 20 LHSV; and, lube dewaxing of various lube stocks such as light neutral, heavy neutral and bright stocks with reaction conditions including a temperature of from about 450° F. to about 700° F., a pressure of from about 100 psig to about 2000 psig, an LHSV of from about 0.1 to about 10, and a hydrogen/feedstock ratio of about 200 to about 8000 SCF/bbl.

The light aromatic compound to be contacted with the spent catalyst must satisfy three requirements: it must be able to penetrate the catalyst so as to contact the carbonaceous residue contained therein, it must be capable of undergoing alkylation by alkyl fragments contributed by components(s) of the carbonaceous residue and, as akylated, it must be capable of diffusing from, or otherwise getting out of, the catalyst.

Useful light aromatic compounds or mixtures thereof will usually possess boiling points not higher than 220° C., and preferably not higher than about 150° C. The light aromatic compound or mixture thereof selected is contacted with the spent catalyst in the amount ranging from about 0.2 to about 40 weight percent, and preferably from about 0.5 to about 15 weight percent, of the carbonaceous residue. Suitable aromatic hydrocarbons include benzene, toluene, o-, m- and p-xylene, ethylbenzene, isopropylbenzene, butylbenzene and mixtures thereof. Benzene, toluene and the xylenes are especially preferred.

The spent catalyst is contacted with the light aromatic compound(s) at atmospheric or higher pressure up to 1500 psig for from about 1 to about 200 hours, preferably from about 20 to about 100 hours, at a temperature from about 600° F. to about 1200° F., preferably from about 700° F. to about 1000° F. Hydrogen is preferably present during reactivation. The precise pressure and temperature of the reactivation treatment and its duration are determined largely by the amount and kind of spent catalyst to be reactivated, the amount and chemical composition of the carbonaceous residue, the nature of the light aromatic compound(s) contacted with the spent catalyst and whether hydrogen is present. Optimum reactivation conditions for particular situations can readily be determined by routine testing.

During the reactivation procedure herein, dealkylated aromatic components are desorbed from the catalyst and carried away therefrom in the alkylated light aromatic stream. If desired, this mixture of dealkylated and alkylated aromatic products can be employed directly in other uses, e.g., as fuel, as blending components for gasoline solvent, etc., or it can be resolved into individual compounds and/or fractions having similar uses or use as intermediates for a variety of industrially important syntheses. Thus, the method of this invention is not only to be considered as a method for reactivating a spent porous crystalline catalyst, but also as a method for converting light aromatics by alkyl transfer to alkylaromatic compounds.

Although spent, porous, crystalline catalysts resulting from any of the conversion processes described above as well as from other types of conversions can be suitably reactivated by the method of this invention, reactivation will be more particularly described in connection with the treatment of a metal-containing aluminosilicate zeolite of medium pore size, namely Ni-ZSM-5, resulting from a catalytic hydrodewaxing operation. Catalytic dewaxing employing medium pore zeolites is known from, among others, U.S. Pat. Nos. 3,700,585 (Reissue No. 28,398); 3,894,938; 4,176,050; 4,181,598; 4,222,855; 4,229,282; 4,247,388; and, 4,560,469.

The following examples illustrate the regeneration or reactivation of the catalyst by coking.

EXAMPLE 2

This example illustrates the reactivation of a spent Ni-ZSM-5 catalyst obtained from the isothermal dewaxing of a heavy neutral raffinate feedstock.

A. Catalyst Aging Under Isothermal Dewaxing Conditions

Dewaxing was carried out in a microreactor having a length to diameter ratio of about 10. The catalyst was steamed Ni-ZSM-5 1/16" extrudate crushed and sized to 20/40 mesh. The fresh catalyst was activated in situ at 400° F. and 400 psig with 2.3% of $H_2S$ for 1 hour. All of the dewaxing runs were carried out at 300° C., 1 LHSV, 400 psig and a hydrogen/feedstock ratio of 2500 SCF/bbl.

FIG. 2 shows the isothermal aging profile of the catalyst. The reactor temperature was held constant at 300° C. and the pour point of the lube product was allowed to drift upward as the catalyst lost activity. (As discussed earlier, in ordinary practice product pour point is held constant and the reactor temperature is increased as necessary to accomplish this). Over a period of 12.5 days on stream, the pour point of the product changed from 10° to 75° F. indicating substantial deactivation of the catalyst.

B. Catalyst Reactivation

Before each reactivation discussed below was carried out, the feed was discontinued and the temperature was dropped to 200° C. The feed system, reactor, catalyst and collection vessels were thoroughly cleaned of traces of feed by rinsing with toluene at 200° C.

Figure 3:
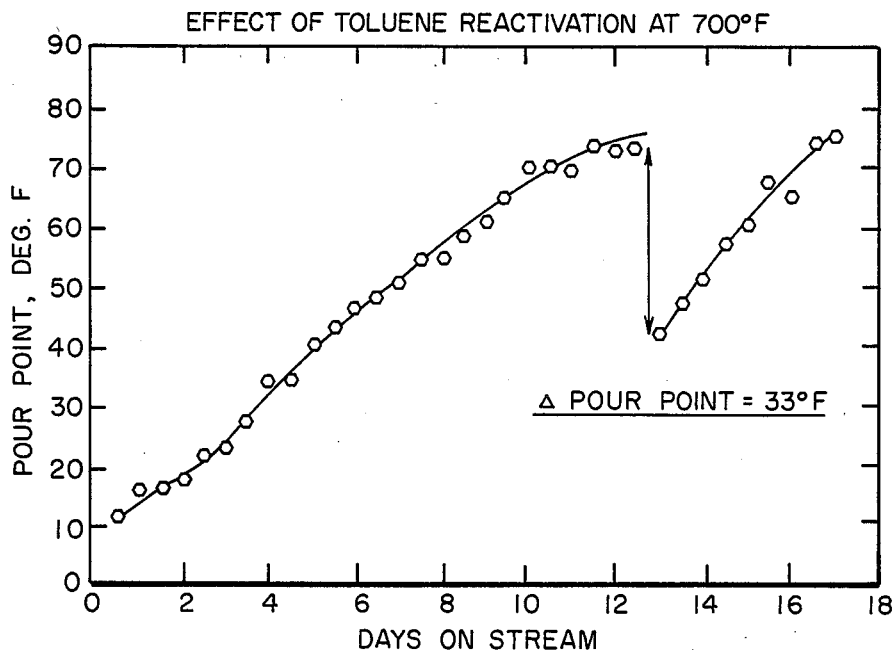
FIGS. 3–8 show the effects of reactivating dewaxing catalyst with low molecular weight aromatic compounds. These figures are more fully explained below.
Figure 4:
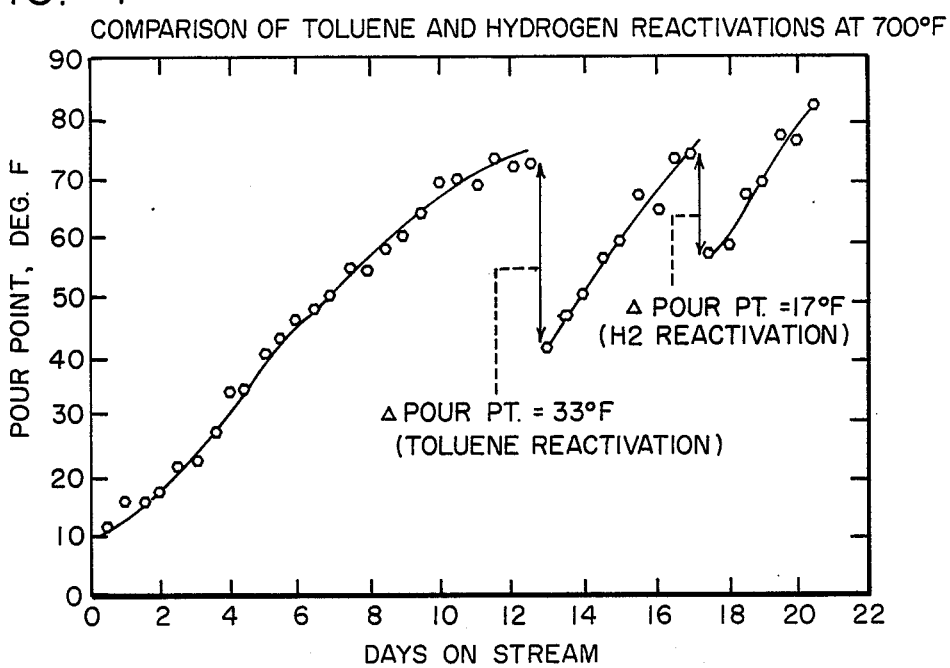

The temperature of the reactor was gradually raised, over a period of an hour, to 371° C. Reactivation with toluene as the light aromatic feed was carried out at 1 LHSV, 400 psig and 2500 SCF/barrel of hydrogen for a period of 43 hours. At the end of this period, the reactivation was halted. The toluene feed was replaced with heavy neutral raffinate feedstock and the catalyst brought back on stream. FIG. 3 shows the effect of the toluene reactivation. The pour point of the first sample of product after reactivation was 42° F., a change of 33° F. from the pour point just before reactivation. The catalyst was kept on stream in this second cycle of isothermal dewaxing until the pour point again reached 75° F., a process which took 6 days on stream. At the end of the second cycle, the catalyst was subjected to hydrogen reactivation under identical temperature conditions as for the toluene reactivation. At the end of the 43 hour hydrogen reactivation, the catalyst was brought back on stream with the heavy neutral raffinate feedstock. FIG. 4 shows the efficiency of this hydrogen reactivation procedure. The pour point on the first day of this third cycle was 58° F., an improvement of only 17° F., compared to the 33° F. observed for toluene reactivation under identical conditions.

EXAMPLE 3

Figure 5:
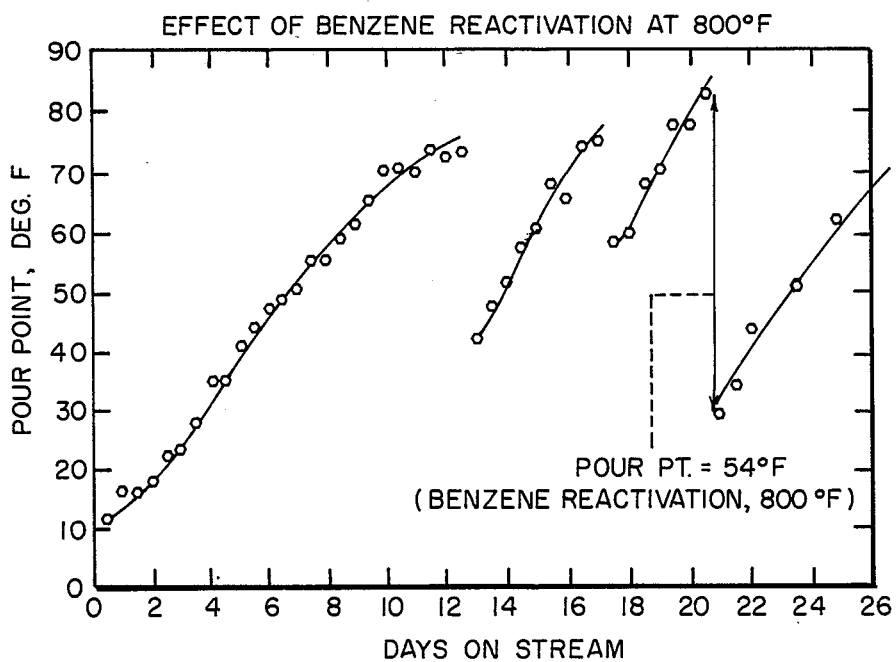

The Ni-ZSM-5 catalyst of Example 1 was aged to obtain a product having a pour point of 83.3° F. employing substantially the same isothermal dewaxing conditions set forth in that example. Reactivation of the deactivated catalyst was then carried out employing benzene as the light aromatic stream. Reactivation was carried out at 800° F. for a period of 48 hours. At the end of the reactivation procedure, the catalyst was brought back on the stream with the same heavy neutral raffinate used in aging the catalyst at 572° F. (FIG. 5). The pour point on the first day on stream was 29.6° F., an improvement of about 54° F. over that provided by the spent catalyst.

EXAMPLE 4

Figure 6:
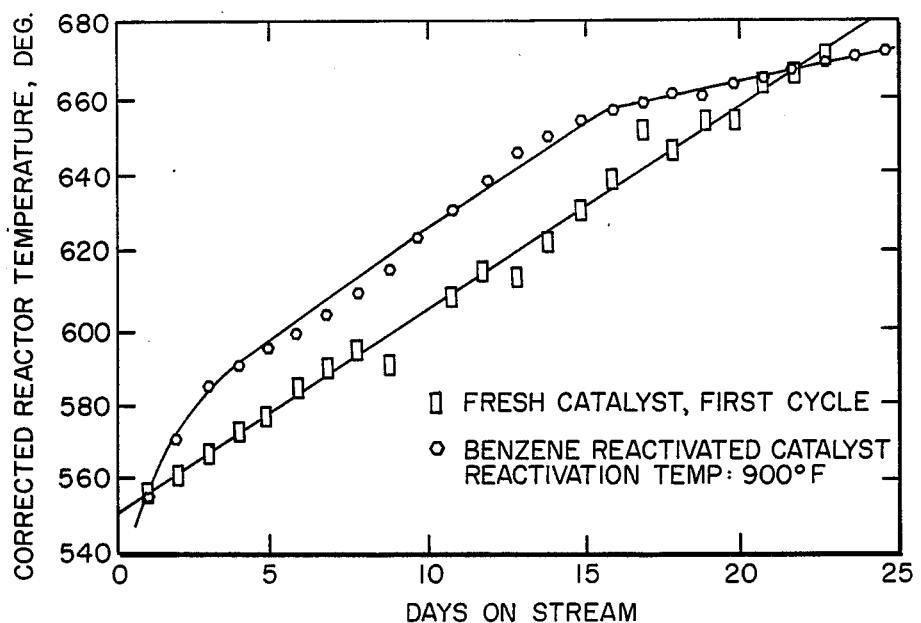

Over a period of 8 days, the Ni-ZSM-5 catalyst of Example 3 was aged back to obtain a product having a pour point of 74° F. Regeneration was carried out with benzene at 900° F. over a period of 46 hours. Dewaxing was resumed with the same heavy neutral raffinate feedstock as before, but in place of the isothermal dewaxing conditions of Examples 1 and 2, the pour point of the product was held to a target value of 20° F. and the temperature was increased to achieve this value. The corrected reactor temperature plotted against days on stream in this dewaxing procedure are shown in FIG. 6. For comparison purposes, the results of a separate dewaxing procedure on fresh Ni-ZSM-5 catalyst under identical conditions are also shown in FIG. 6. Although the reactivated catalyst aged rapidly for the first two days, after this initial period the catalyst stabilized and the aging rates of the fresh and reactivated catalyst were very similar. After 16 days on stream, the aging rate decreased sharply to about 1.5°/day. This was maintained until the twenty-sixth day when the corrected reactor temperature reached the ceiling value of 675° F. and the dewaxing operation was terminated. By contrast, the cycle length of the fresh, first cycle catalyst was only 23 days.

EXAMPLE 5

This example illustrates the reactivation of spent Ni-ZSM-5 catalysts which had become deactivated while cracking n-dodecane at 289° C., 400 psi total pressure and 50 atm cc $H_2$/min. The example also demonstrates the advantage of carrying out the reactivation procedure herein in the presence of hydrogen over reactivation with hydrogen alone. In order to accelerate catalyst aging, 1-methylnaphthalene (1-MeN) was included in the n-dodecane feedstream.

Figure 7:
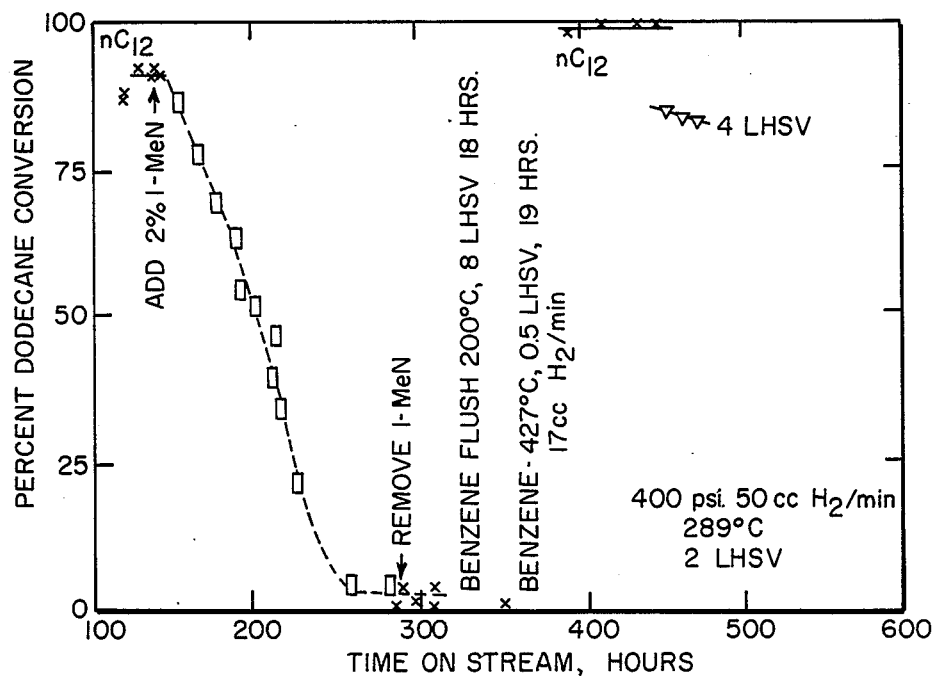
Figure 8:
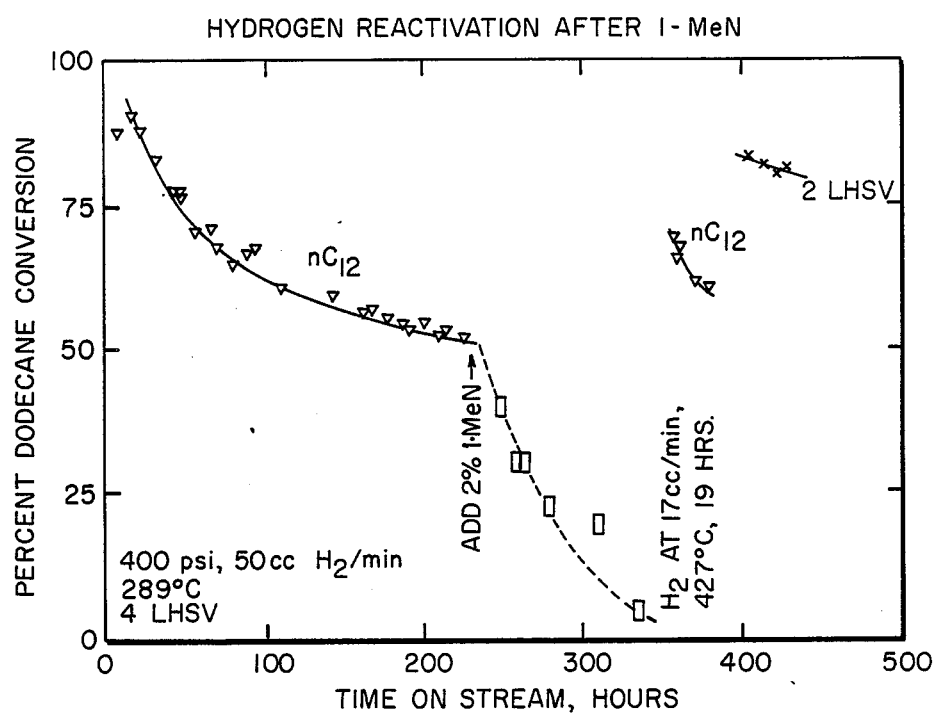

Reactivations of the 1-MeN deactivated catalysts were performed at 427° C. for 19 hours with benzene/$H_2$ mixture (0.5 LHSV benzene/17.3 atm cc/min $H_2$) and $H_2$ alone at 17.3 atm cc/min. The results are compared graphically in FIGS. 7 and 8. The addition of 2 wt % 1-MeN reduced the conversion of the n-dodecane feed to less than 5% in 100 hours.

Neither washing with pure n-dodecane at reaction temperature (289°) nor washing with benzene at 200° C. restored any cracking activity to the catalyst (FIG. 1). However, after treatment with the benzene/hydrogen mixture at 427° C. as described above, the catalyst had recovered 99% conversion of n-dodecane at 2 LHSV. At 4 LHSV, the activity level was 82%.

In the treatment of similarly deactivated Ni-ZSM-5 catalyst with hydrogen at identical time, temperature, flow conditions, the resulting conversion of n-dodecane at 4 LHSV was 68% compared to the fresh catalyst activity of 90% (FIG. 2). The hydrogen-reactivated catalyst at 2 LHSV had an activity of 83%. The data are set forth in the following Table.

TABLE
ADVANTAGE OF BENZENE AND HYDROGEN OVER HYDROGEN ALONE FOR REACTIVATION OF SPENT CATALYST

| | Conversion of n-dodecane % | | |
|---|---|---|---|
| LHSV | Fresh Catalyst | Reactivation With Benzene (Bz) and $H_2$ | Reactivation with $H_2$ alone | $B_z$-$H_2$% |
| 2 | 99 | 99 | 83 | $\geq$17 |
| 4 | 90 | 82 | 68 | 14 |

The Table shows that reactivation with benzene-$H_2$ over reactivation with $H_2$ alone under identical reactivation conditions resulted in 1-$\geq$17% higher n-dodecane conversion.

The foregoing description of the invention is offered to illustrate the invention but it is obvious that changes may be made in the process without departing from the spirit thereof, and the invention includes all such modifications.

We claim:

1. A process for dewaxing a wax-containing lube stock which comprises:
   dewaxing said lube stock with a fresh zeolite dewaxing catalyst, having a constraint index between 1 and 12, in an original catalyst dewaxing cycle, wherein prior to said original dewaxing cycle the fresh catalyst is pretreated in the presence of hydrogen gas with one or more low molecular weight aromatic hydrocarbon compounds selected from the group consisting of benzene, toluene, xylene, naphthalene and mixtures thereof at temperatures greater than 800° F. and under conditions which deposit on the catalyst between 2 and 30% of coke, by weight of the catalyst;
   continuing said first catalytic dewaxing cycle to an end of cycle dewaxing reaction temperature of between 650° to 680° F. at which point said dewaxing catalyst is substantially deactivated; and
   regenerating said pretreated dewaxing catalyst by contacting the substantially deactivated catalyst with hydrogen and one or more low molecular weight aromatic hydrocarbon compounds selected from the group consisting of benzene, toluene, xylene, naphthalene or mixtures thereof at a temperature from 600° to 1200° F. to reactivate the catalyst.

2. The process as recited in claim 1, which further comprises using the reactivated catalyst in a subsequent dewaxing cycle.

3. The process as recited in claim 1, wherein the pretreatment step is conducted at temperatures greater than 900° F.

4. The process as recited in claim 1, wherein the fresh catalyst is coked for 72 hours.

* * * * *